3,328,855
SAFETY PIN
Joseph A. Benoit, P.O. Box 337, Springhill, La. 71075
Filed May 24, 1965, Ser. No. 458,007
1 Claim. (Cl. 24—161)

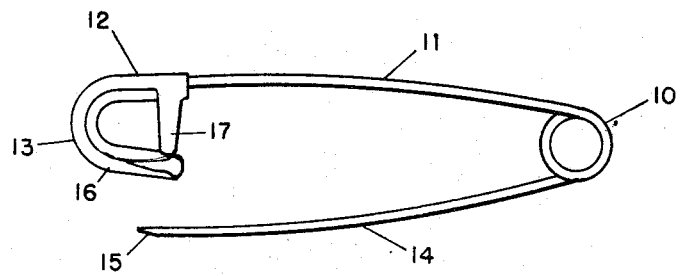
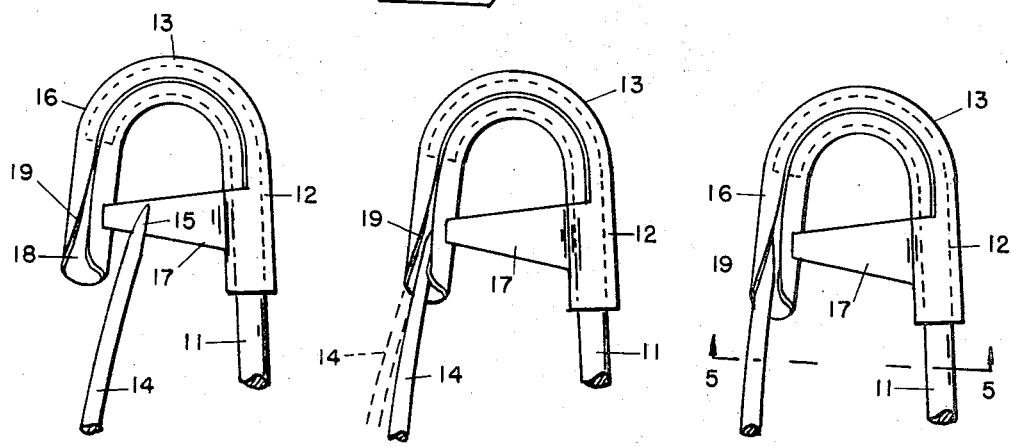
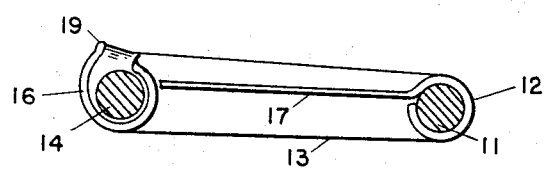

This invention relates to safety pins and is particularly concerned with a generally conventional design and construction but which requires a manually directed compound motion and snap action of the pin point for its securement or release. The securement and release may be readily effected by a single hand of an operator familiar with the required securement and release motion, however, the required technique for release or securement will frustrate youthful or uninitiated persons unfamiliar with the special type motion required in the manipulation of the pin.

While certain characteristics of the present inventive concept may be broadly applicable to a wide variety of securing devices, the invention is primarily intended for, and is here illustrated for use in a conventional safety pin of the type having a spring wire coil at one end, with substantially parallel legs extending therefrom, and a receiving head being formed on one leg while the other leg is sharpened to provide the pin point. In such conventional pins the receiving head at the outer end of one leg, which may be considered as substantially stationary, is usually formed in a U-shaped manner and provides an opening facing toward the coil at the opposite end of the stationary leg.

In such conventional safety pins, the relatively movable or flexible leg is normally biased toward movement outwardly from the head substantially in the plane defined by the legs in normal position. Thus, in releasing the conventional pin from the head, the pin point end is forced inwardly towards the stationary leg to free itself from the confines of the receiving portion of the head, and a slight lateral movement, automatically induced by engagement of the pin point with an intermediate guide plate, then permits the point to spring outwardly free of the head. For engagement, the pin point is first moved inwardly toward the fixed leg, its normal resiliency aligned with the receiving opening of the head and upon releasing, the point springs outwardly into the confines of the head.

In the present invention, the required lateral motion is greater and must be concisely induced by the operator to produce a snap action in which the movable leg is longitudinally flexed to provide registration of its point with a lateral entrance to the head. The lateral entrance opening is slightly out of alignment with the axis of the pin point when the movable leg is relaxed and may be somewhat shorter than that portion of the pin point to be received therein since the flexing of the leg in the normal plane of the legs will reduce the effective length of the movable leg. In the present invention the head is formed adjacent its lateral opening, with guide and guard flanges which require a snap action of the pin point in entry or release from the head.

From the foregoing it will be seen that the present invention provides for a novel and improved safety pin by which retention and release of the pin requires conscious lateral motion of the pin point by the operator. Thus, the present safety pin will present a problem as to securement and release by youthful and/or uninitiated persons not having previous experience with such safety pins. The present invention also provides a novel safety pin constructed and arranged to appear substantially in the manner of the conventional safety pin now available on the market, but requiring a novel method for release and securement of the point of the pin.

The pin of the present invention is simple in construction and operation, and well-designed to meet the demands of the economic manufacture.

Numerous other features and advantages of the present invention will be apparent from consideration of the following specification taken in conjunction with the accompanying drawings in which:

FIG. 1 is a side elevation of one form of the present inventive concept showing the pin point released from the head;

FIG. 2 is an enlarged detailed view of the head showing the pin point in inward position in the plane of the legs;

FIG. 3 is similar to FIG. 2 showing the pin in fully secured position showing by dotted lines the longitudinal flexing of the movable leg;

FIG. 4 is a view similar to FIGS. 2 and 3 showing the pin in registration with the lateral opening of the head ready for disengagement or release therefrom; and, FIG. 5 is an enlarged sectional view taken on the lines 5—5 of FIG. 4.

Referring now to the drawings it will be seen that general construction of the safety pin of the present invention follows the general formation and character of the conventional safety pin now available on the market. In this respect the pin includes a double helical coil 10 at the inoperative end of the pin. From the coil 10 a relatively fixed substantially straight stationary leg 11 extends to receive on its opposite end the tubular shank 12 of the securing head 13 of the pin. From the other end of the coil 10 a relatively movable and longitudinally flexible leg 14 extends terminating in the conventional sharpened pin point 15. As in conventional safety pins, when secured, the legs 11 and 14 are in substantially parallel relation. When the pin point 15 is released, the leg 14 flexes outwardly to the open relaxed position in the normal plane of the legs as indicated in FIG. 1 of the drawing.

The head 13 of the pin is preferably formed of rolled sheet material by which the inner shank 12 forms a tubular receptor for the outer end of the leg 11. The tubular form of the head 13 is substantially U-shaped, the legs of the U being formed by the shank 12 and its opposed shank 16, the mouth of the U being directed towards the coil 10.

The present invention, unlike the conventional safety pin in which the free shank of the head is fully open inwardly with its opening facing the fixed shank, is provided with a lateral tapering opening 18 at the side of the shank 16. One feature of the opening 18 is that its axis, see FIG. 3, is slightly inclined from the axis of the point 15. Thus, a flexing of the leg 14 is required for accurate alignment of the point with the opening 18.

For guiding of the pin point in its securing and releasing motions, a guide plate 17 is provided extending from the shank 12 transversely of the head and toward the shank 16. It will be noted as shown in FIG. 5 that the plane of the guide plate 17 is substantially midway of the rounded configurations of the shanks 12 and 16, thus lying in the normal plane of the legs 11–14.

At the outer edge of the opening 18 a laterally curved lip 19 is provided which upon an inward movement of the pin point 15 toward the leg 11 cams the point laterally causing the point to snap past the lip 19 and pass beyond the opening. In such inward movement as in securing the point within the head 13 upon passing the lip by snap action, the point comes to rest upon the intermediate guide plate 17. Thereafter as pressure is relaxed, the point will spring outwardly away from the leg 11 along the surface 15 until it is arrested by the outward flaring of the inner edge of the opening 18. By such arresting of the outward spring of the lateral inner edge of the opening a flexing of the leg 14, as shown by the dotted lines of FIG. 3 is required as the point snaps over the inner edge of the opening. Such flexing will be automatically effected by a lateral pressure on the pin point which in combination with its natural outward flexing will snap the point into the opening 18. Release of the point will then secure it within the confines of the head 13, as in FIG. 4.

To release the pin it will be understood that a reverse snap action is required. This is accomplished by an inward force on the leg 14 accomplished by an outward lateral pressure away from the normal plane of the legs. In response to such directed pressure the point 15 will first engage the internal face of the inner edge of the opening 18 to again flex the leg to the position of the dotted lines of FIG. 3 and thereafter the point will snap outward laterally from the head of reverse by its own spring action the open position of FIG. 2.

From the foregoing it will be seen that the present pin provides a novel and improved safety pin, generally conventional in appearance but requiring a varied technique in operation. Thus, the pin is doubly safe in detering operation by young persons and those unfamiliar with the special technique required. It will, of course, be understood that in the manufacture of the pin of the present invention, numerous changes, modifications, and full use of equivalents may be resorted to without departing from the spirit or scope of the invention as defined in the appended claim.

I claim:

A guard adapted to be secured to the free end of one leg of a U-shaped pin and having means thereon for protecting the pointed free end of the other leg of the pin to form therewith a safety pin, said means comprising a laterally extending point receiving slot having edge portions thereof provided with outwardly extending flanges formed so as to snappingly guide the point into said slot when said other leg is longitudinally flexed out of normal alignment so as to align the pointed free end thereof with the axis of the slot, said guard having transversely extending guide means lying in the normal plane of said legs to facilitate opening and closing of the safety pin.

References Cited

UNITED STATES PATENTS

| 199,511 | 1/1878 | Butler | 24—161 |
| 2,045,666 | 6/1936 | McPhee | 24—150 |
| 2,084,480 | 6/1937 | Crandall. | |
| 2,529,383 | 11/1950 | Glasband | 24—156 |
| 2,971,235 | 2/1961 | Benoit | 24—161 |

FOREIGN PATENTS

| 1,960 | 1877 | Great Britain. |

WILLIAM FELDMAN, *Primary Examiner.*

DONALD A. GRIFFIN, *Examiner.*